(12) United States Patent
Lin

(10) Patent No.: US 7,459,109 B2
(45) Date of Patent: Dec. 2, 2008

(54) METHOD FOR MANUFACTURING FOAM PADS

(76) Inventor: Wen Shan Lin, No. 123, Tzu Li 2nd St., Wu Chi Town, Taichung (TW) 435

( * ) Notice: Subject to any disclaimer, the term of this patent is extended or adjusted under 35 U.S.C. 154(b) by 663 days.

(21) Appl. No.: 11/233,050

(22) Filed: Sep. 23, 2005

(65) Prior Publication Data
US 2007/0069410 A1    Mar. 29, 2007

(51) Int. Cl.
C08J 9/232 (2006.01)
C08J 9/06 (2006.01)

(52) U.S. Cl. .............................. 264/54; 264/41; 264/48; 264/51

(58) Field of Classification Search ................... 264/41, 264/48, 51, 54; 428/304.4, 314.2
See application file for complete search history.

(56) References Cited

U.S. PATENT DOCUMENTS 4,158,538 A * 6/1979 Kleiner et al. .............. 425/445
4,381,962 A * 5/1983 Sato et al. .............. 156/244.11
4,415,514 A * 11/1983 Dorrestijn et al. ............. 264/53
5,087,395 A * 2/1992 Hitchcock ................... 264/419

* cited by examiner

Primary Examiner—Sam Chuan Yao
Assistant Examiner—Robert J Grun
(74) Attorney, Agent, or Firm—Ming Chow; Sinorica, LLC

(57) ABSTRACT

A method for manufacturing foam pads includes a first step of preparing a proper amount of PVC power, DOP curing agent, light calcium carbonate, kaolin, foaming agent and pigment and pouring them into a blending device to be blended and form a liquid starchy material. Next, the liquid starchy material is conveyed into an intermediate material barrel and kept stationary for pre-foaming at normal temperature for about 8 hours and then coated on a conveyer pelt to form a starchy material layer. Subsequently, the starchy material layer is kept stationary and heated at 80-90° C. for about 3-10 minutes and then continuously heated at 185-200° C. for about 20-30 minutes to form an integral-sheeted foam pad. After cooled, the integral-sheeted foam pad is thermo-compressed and cut into various foam pad products.

5 Claims, 4 Drawing Sheets

METHOD FOR MANUFACTURING FOAM PADS

BACKGROUND OF THE INVENTION

1. Field of the Invention

This invention relates to a method for manufacturing foam pads, particularly to one able to form air bubbles communicating with one another successively in the interior of a shaped foam pad so that the foam pad has an excellent effect of fatigue resistance.

2. Description of the Prior Art

Articles made of foam pads have been widely used either in people's livelihood or in sports. Generally, a conventional method for manufacturing foam pads includes the following steps: Firstly, a proper amount of polyvinyl chloride (PVC) powder, dioctyl phthalate (DOP) curing agent, light calcium carbonate, kaolin, foaming agent and pigment are blended together. Secondly, the mixture of the materials is compressed and coated on a conveyer belt or on separable paper by rollers and then heated and foamed in shape at high temperature. Lastly, the foam pad shaped is thermo-compressed in a mold and then cut into foam pad finished products.

However, although various foam pad products can be produced by the conventional method as described above, yet the air bubbles formed in the interior of the foam pad are respectively a closed air bubble not communicating with one another. Therefore, when such a foam pad is compressed, the individual air bubble being compressed will immediately produce a rebounding force. Under the circumstances, although the foam pad has buffer elasticity, its rebounding or buffering force is comparatively strong; therefore, some products made of such foam pads, such as shoe pads, sports pads or the like, may make a user feel uncomfortable at his foot or at a certain part where is compressed by the foam pad, and even may cause aching in muscles in case of using the foam pad product for a long period of time.

SUMMARY OF THE INVENTION

The objective of the invention is to offer a method for manufacturing foam pads, which includes a first step of preparing a proper amount of PVC powder, DOP curing agent, light calcium carbonate, kaolin, foaming agent and pigment and pouring them into a blending device to be blended together to form a liquid starchy material. Next, the liquid starchy material is conveyed into an intermediate material barrel and kept stationary therein for pre-foaming at normal temperature for about 8 hours and then coated on a conveyer belt to make up a starchy material layer. Subsequently, the starchy material layer is kept stationary and orderly heated by a roasting oven at the temperature of 80-90° C. for about 3-10 minutes and then continuously heated by another roasting oven at the temperature of 185~200° C. for about 20-30 minutes to form an integral-sheeted foam pad. Afterward, the integral-sheeted foam pad is cooled and then thermo-compressed into various shapes and formed with different surface streaks. Lastly, the integral-sheeted foam pad is cut into different foam pad products according to practical needs. Manufactured in such ways, the foam pad product is formed in the interior with numerous air bubbles that communicate with one another successively. Therefore, when the foam pad product is compressed, its rebounding or buffering force can be delayed and become moderate, having an excellent effect of fatigue resistance and able to make a user feel comfortable.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
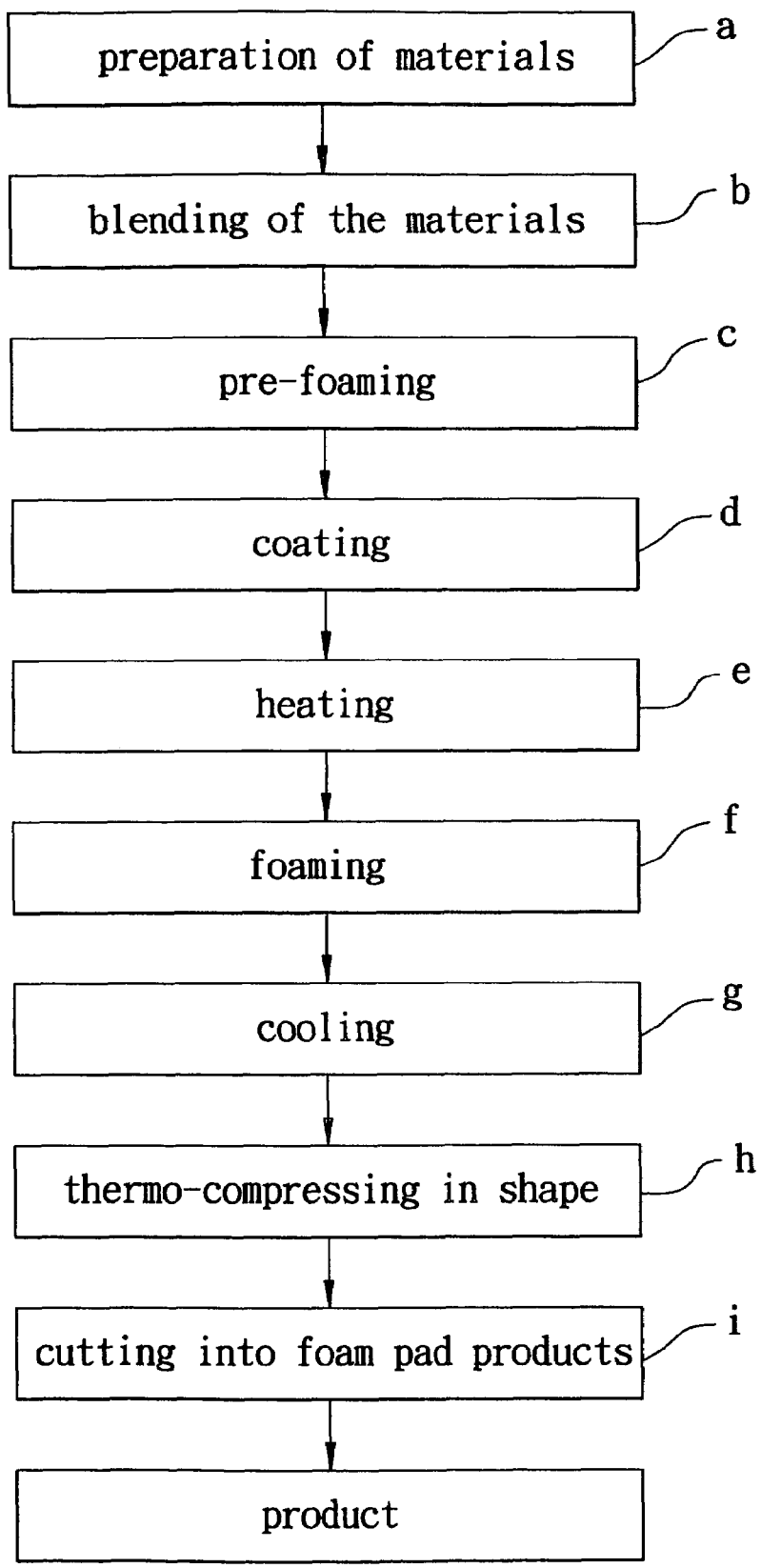
FIG. 1 is a block diagram of the steps of manufacturing foam pads in the present invention.
Figure 2:
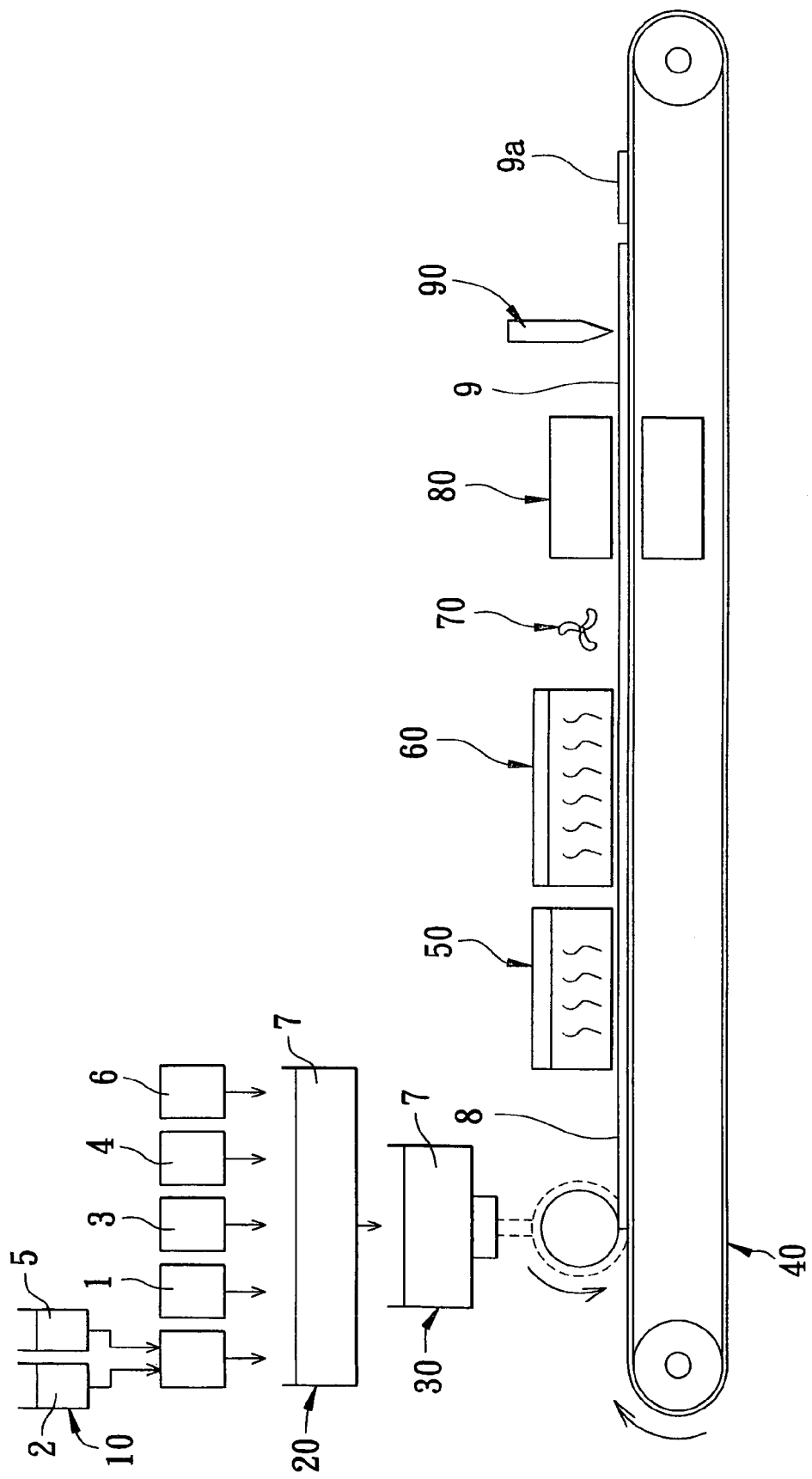
FIG. 2 is a front view of the arranged location of the devices for manufacturing foam pads in the present invention.

A preferred embodiment of a method for manufacturing foam pads in the present invention, as shown in FIGS. 1 and 2, includes the following steps.

A first step is preparation of materials: Prepare a proper amount of PVC powder 1, DOP curing agent 2, light calcium carbonate 3, kaolin 4, foaming agent 5 and pigment 6 and pour them into a material barrel 10.

A second step is blending of the materials: the foresaid materials are poured into a blending device 20 to be blended together to form a liquid starchy material 7. Among the materials mentioned above, the foaming agent 5 and the DOP curing agent 2 have to be blended together in advance before they are poured into the blending device 20 to be blended with other materials.

A third step is pre-foaming: the liquid starchy material 7 is conveyed into an intermediate material barrel 30 and kept stationary under normal temperature for about 8 hours in order to let the liquid starchy material 7 produce pre-foaming action and enable air bubbles to grow incessantly therein.

A fourth step is coating: the liquid starchy material 7 is coated on a conveyer belt 40 in an open state so as to form a starchy material layer 8 with a proper thickness on the conveyer belt 40.

A fifth step is heating: the starchy material layer 8 is kept stationary and heated by a roasting oven at the temperature of 80~90° C. for about 3~10 minutes.

A sixth step is foaming: the starchy material layer 8 is continuously heated by another roasting oven 60 at the temperature of 185~200° C. for about 20-30 minutes to let the starchy material layer 8 foam completely and make up an integral-sheeted foam pad 9 with a proper thickness.

A seventh step is cooling: the integral-sheeted foam pad 9 is properly cooled by cooling fans 70 or in other ways.

An eighth step is thermo-compression in shape: the foam pad 9 is thermo-compressed by shaping molds 80 for making various shapes and producing different surface streaks according to practical needs.

A ninth step is cutting: the integral-sheeted foam pad 9, after thermo-compressed in shape, is properly cut into different foam pad products (9a), such as shoe pads and sports pads, by a cutting device 90.

Figure 3:
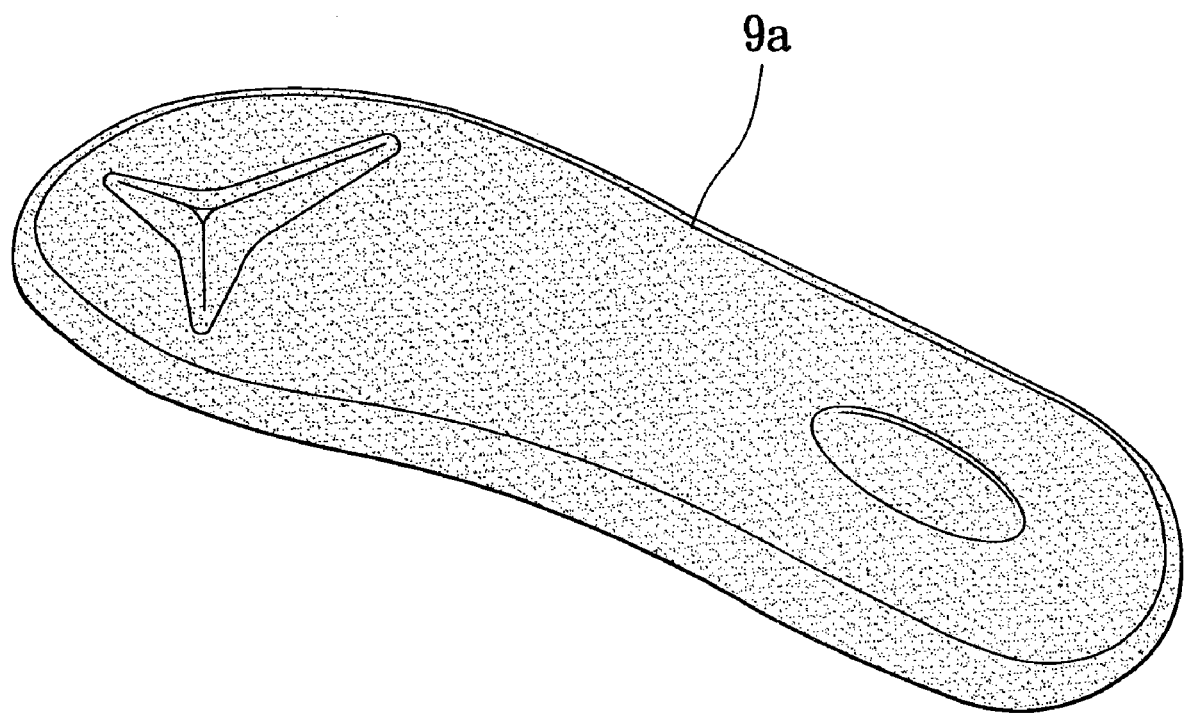
FIG. 3 is a perspective view of a shoe pad made of the foam pad in the present invention.
Figure 4:
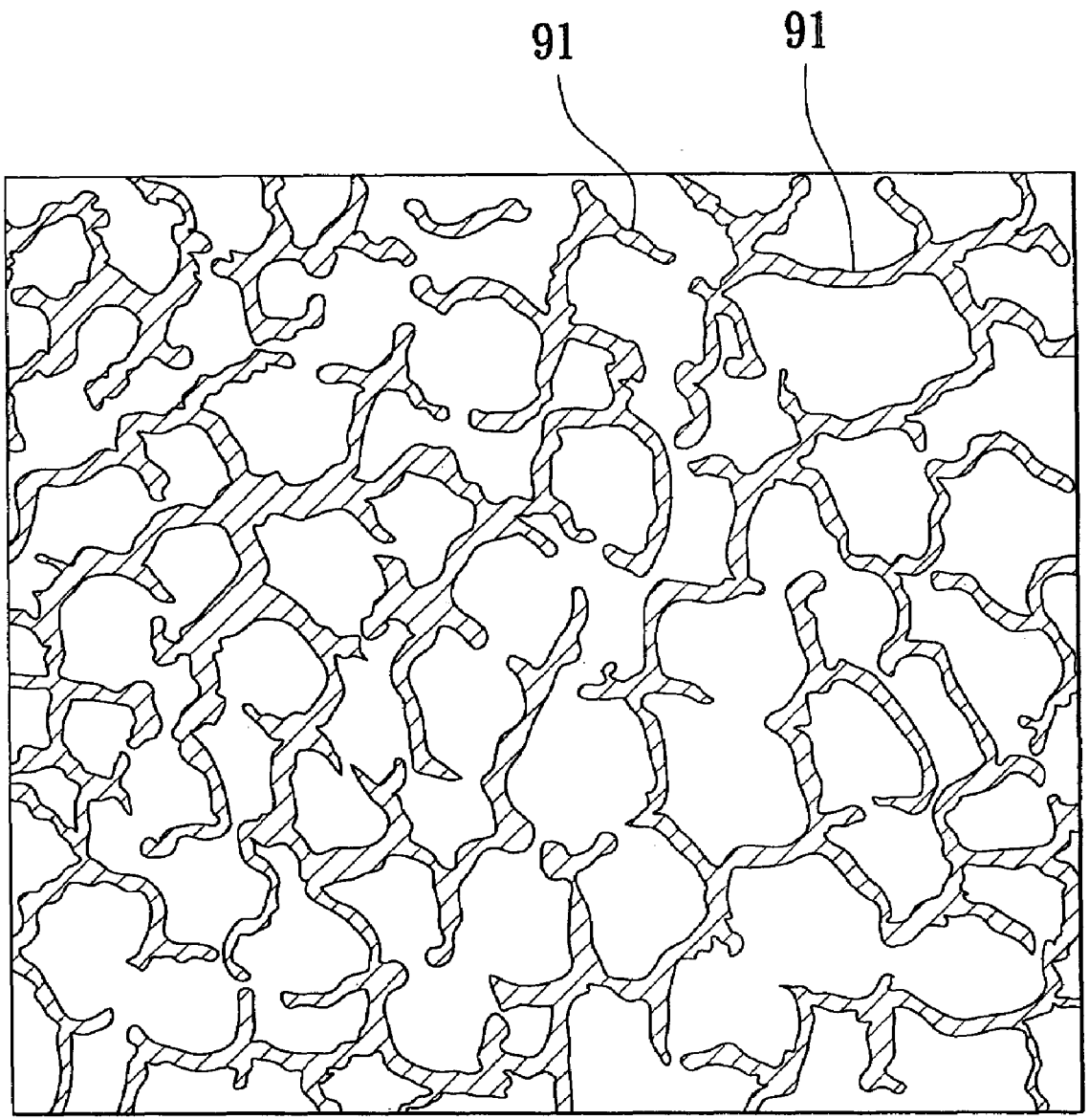
FIG. 4 is a cross-sectional view of the texture of the air bubbles formed in the interior of the foam pad in the present invention.

Specifically, referring to FIGS. 3 and 4, since the materials for making the foam pad 9 are fully blended and reacted, as described in the second step of material blending, and pre-foaming is carried out for 8 hours; therefore, the viscosity of the starchy material can be controlled effectively. In addition, after coated on the conveyer belt 40 in an open state, the starchy material layer 8 is kept stationary and heated to enable air bubbles in the starchy material to grow freely and let air bubbles burst to form numerous different-sized air bubbles before the starchy material layer 8 gels completely, and after bursting, the air bubbles 91 in the foam pad 9 can communicate with one another successively, with the bursting rate of the air bubbles 91 reaching 94%. Thus, when the foam pad product (9a) of this invention, like a shoe pad or a sports pad, is trodden or compressed by a user, air in the air bubbles 91 of the foam pad product (9a) will flow about to delay the rebounding or buffering force of the foam pad product (9a). Therefore, the foam pad product (9a) of this invention has excellent buffering effect and can make a user feel comfortable at the feet or other parts compressed by the foam pad, having an excellent effect of fatigue resistance and avoiding causing aching to the user.

While the preferred embodiment of the invention has been described above, it will be recognized and understood that various modifications may be made therein and the appended claims are intended to cover all such modifications that may fall within the spirit and scope of the invention.

I claim:

1. A method for manufacturing foam pads comprising:
   - a first step of preparation of materials; preparing a proper amount of PVC powder, DOP curing agent, light calcium carbonate, kaolin, foaming agent and pigment;
   - a second step of blending of said materials; said materials poured into a blending device, said materials blended together in a blending device to form a liquid starchy material;
   - a third step of pre-foaming; said liquid starchy material conveyed into an intermediate material barrel, said liquid starchy material kept stationary in said intermediate barrel for about 8 hours for pre-foaming;
   - a fourth step of coating; said liquid starchy material coated on a conveyer belt in an open state after pre-foaming, said liquid starchy material forming a starchy material layer with a preset thickness on said conveyer belt;
   - a fifth step of heating; said starchy material layer kept stationary and heated by a roasting oven at the temperature of 80~90° C. for about 3~10 minutes;
   - a sixth step of foaming; said starchy material layer continuously heated by another roasting oven at the temperature of 185~200° C. for about 20~30 minutes, said starchy material layer foaming and turning into an integral-sheeted foam pad;
   - a seventh step of cooling; said integral-sheeted foam pad properly cooled in a preset way;
   - an eighth step of thermo-compressing in shape; said foam pad thermo-compressed by a mold, said foam pad compressed into various shapes and formed with various surface streaks; and
   - a ninth step of cutting; said integral-sheeted foam pad properly cut into different foam pad products according to practical needs.

2. The method for manufacturing foam pads as claimed in claim 1, wherein said materials are respectively put in a material barrel in advance.

3. The method for manufacturing foam pads as claimed in claim 1, wherein said foaming agent and said DOP curing agent are blended together in advance before they are poured in said blending device to be blended with other materials.

4. The method for manufacturing foam pads as claimed in claim 1, wherein said integral-sheeted foam pad is cooled by cooling fans in the seventh step.

5. The method for manufacturing foam pads as claimed in claim 1, wherein the percentage of open cells of said integral-sheeted foam pad is up to 94%.

* * * * *